Figure 1:
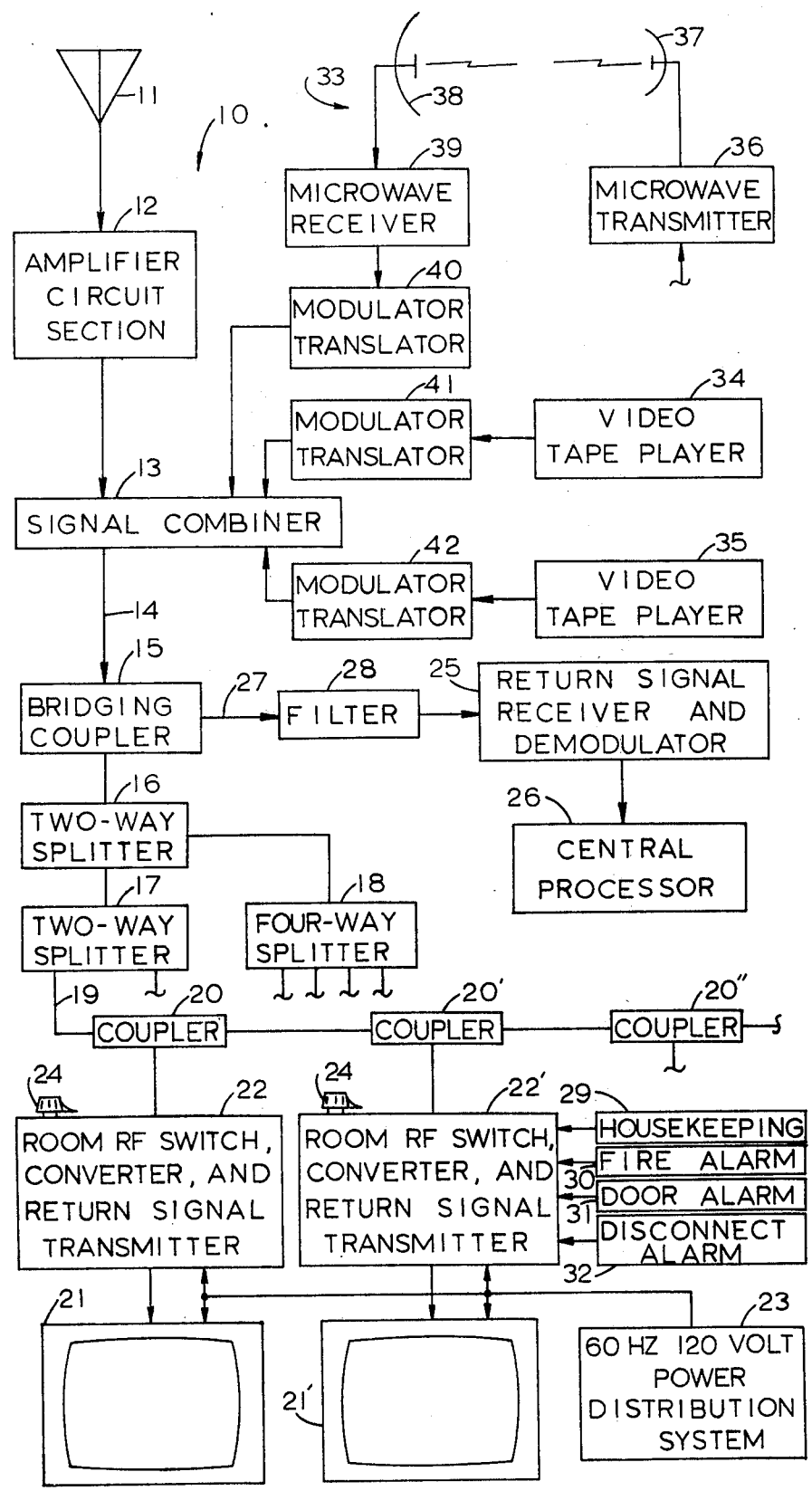

United States Patent [19]

Moorehead

[11] 4,057,829

[45] Nov. 8, 1977

[54] COMMUNICATIONS TV MONITORING AND CONTROL SYSTEM

[75] Inventor: Robert M. Moorehead, Richardson, Tex.

[73] Assignee: Spectradyne, Inc., Richardson, Tex.

[21] Appl. No.: 602,315

[22] Filed: Aug. 6, 1975

Related U.S. Application Data

[63] Continuation-in-part of Ser. No. 425,254, Dec. 18, 1973, abandoned.

[51] Int. Cl.² .............................................. H04N 7/18
[52] U.S. Cl. ........................................ 358/86; 325/31;
  325/308; 358/84; 340/280
[58] Field of Search .............. 178/DIG. 13, DIG. 23;
  325/308, 309, 31; 340/280, 151; 358/84, 86

[56] References Cited

U.S. PATENT DOCUMENTS

| 3,425,050 | 1/1969 | Tellerman | 178/DIG. 1 |
| 3,757,225 | 9/1973 | Ulicki | 325/308 |
| 3,761,914 | 9/1973 | Hardy | 178/DIG. 13 |
| 3,794,922 | 2/1974 | Osborn | 325/31 |
| 3,833,757 | 9/1974 | Kirk | 325/309 |

Primary Examiner—Howard W. Britton
Attorney, Agent, or Firm—Warren H. Kintzinger

[57] ABSTRACT

A communications control system applicable to an existing master antenna television (MATV) system normally installed in a building, or CATV systems that use special entertainment feature inputs including movies and/or sporting events and special services on a controlled pay or non-pay basis, as desired. The system employs one-way intelligence transmission from TV set locations to a central processor receiver and opposite direction program transmission in a selective control monitored mode with minimal additional equipment requirements over those of a basic TV cable system.

11 Claims, 3 Drawing Figures

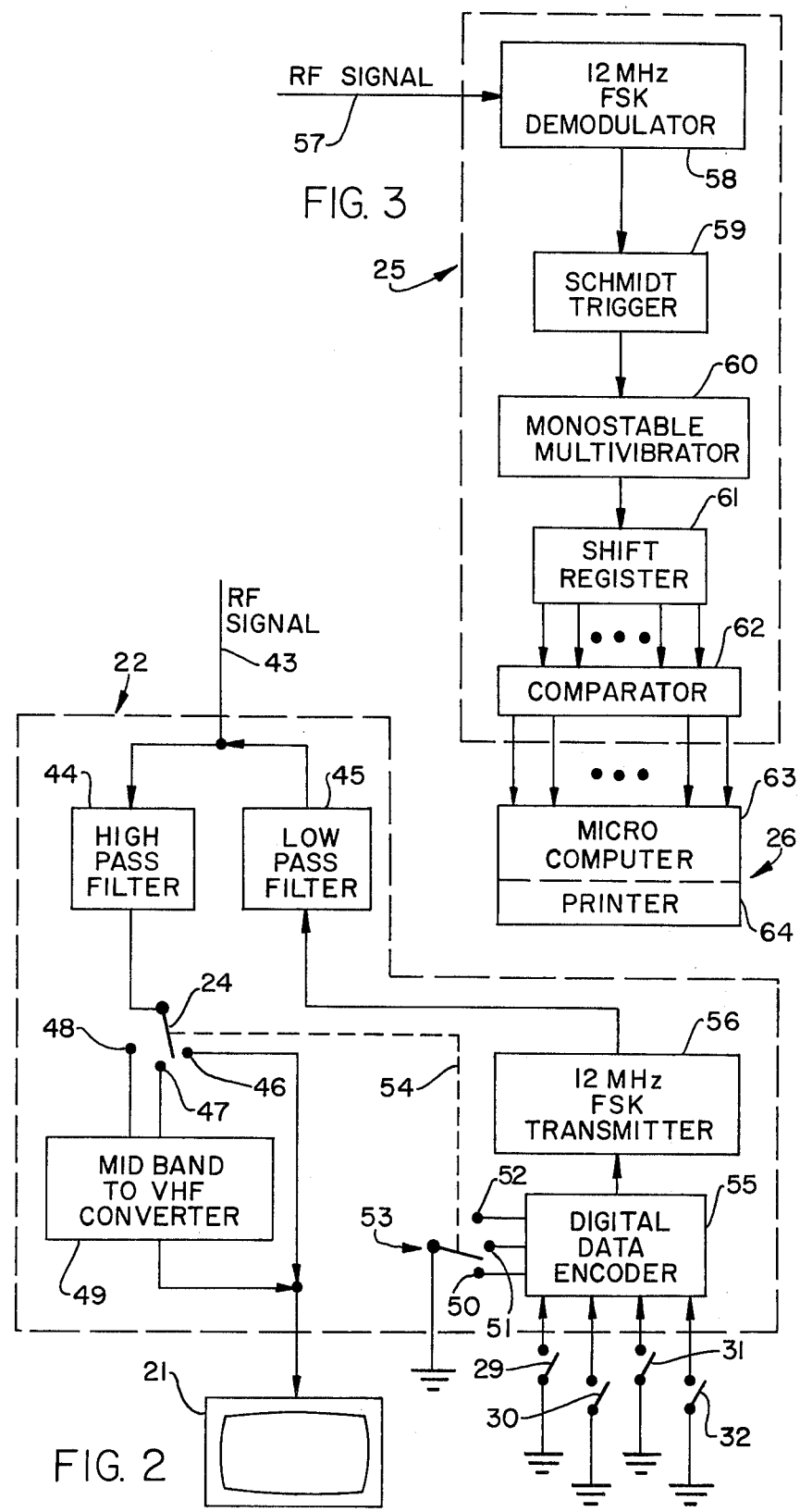

COMMUNICATIONS TV MONITORING AND CONTROL SYSTEM

This is a continuation-in-part application of co-pending parent application Ser. No. 425,254, filed Dec. 18, 1973, by Robert M. Moorehead, Inventor, now abandoned.

This invention relates in general to coaxial cable equipped video transmission systems, and in particular to a pay TV or control monitoring system with program signals moving in one direction from input end to TV sets and control and monitoring messages moving in the opposite direction.

Various systems have been devised for providing paid TV entertainment via cable television (CATV) and master antenna television (MATV) cable distribution systems to TV sets in hotels, motels, apartments, and in the home. Many of these, however, are too complex and much too expensive; and in many instances, they fall far short in providing the quality desired and the reliability required to achieve an acceptable level of success in meeting user demand. Existing pay TV systems require some type of control communication from a central point to the TV set location-such as guest rooms in a hotel or motel. This control communication is used to turn on a converter, unscramble the picture, or by some other means permitting the picture to be seen on a standard television receiver at a prescribed location. One system requires a central computer to interrogate each room terminal in a motel or hotel system installation to determine the status of the switcher in the respective terminals. Obviously there could be great savings achieved along with operational performance improvements if one-way control and/or monitoring signal messages could be implemented in place of two-way control signaling. Further, additional benefits are attainable with one-way signal messages moving from the guest rooms back toward the head end of the system, and to a return message signal receiver at a central processor, opposite in direction to program video signal flow through the system. This is a communication control monitoring approach facilitating utilization of the existing master antenna television (MATV) distribution cable normally existing in hotel and motel buildings, without requiring installation of new distribution wires or cables.

It is therefore a principal object of this invention to provide a communication TV monitoring and control system applicable to existing television video cable distribution systems using special entertainment feature inputs on a controlled pay or non-pay basis, as desired.

Another object is to provide such a communication TV monitoring and control system utilizing one-way message intelligence transmission from TV set locations to a central processor.

A further object with such a system is to minimize additional equipment requirements over those of a basic TV cable distribution system and to provide optimized operational performance along with minimized maintenance requirements and high reliability with a great savings in cost.

Features of this invention useful in accomplishing the above objects include, in an improved communications TV monitoring and control system, utilization of entertainment program inputs, including movies originating from any of several sources such as a microwave link to a hotel or motel or a video tape player installed in the system in the hotel or motel. It is a system utilizing existing cable distribution networks without requiring new wires or cables paralleling the previously installed cable network of a TV distribution system, particularly since two-way control message signal flow is not required, and call-up on telephones is not required. It is a pay TV system permiting use of free TV, billed-for programs, and special service programs, with impulse buying being an important factor in use of paid-for programs. Charged-for programs are assigned to an off-normal TV channel, or channels, and supplied to the TV receiver by frequency translation. Additional equipment requirements are minimized in the system with one-way intelligence message transmission from many TV set locations back to a single central processor receiver with message flow opposite in direction to program signal video flow. The special video program signals originating from a microwave link or a video tape player enter a modulator for modulation on an RF carrier in the mid-band of the broadcast television VHF television band and transmittal through the cable distribution system to the TV set locations. This signal is such that it cannot be seen at the television receiver without first being converted from the mid-band channel, or other channel used, to a locally unassigned one of the standard VHF channels, or other unassigned VHF channel, or one of the UHF channels (14–83). The conversion required is accomplished through a converter at the respective TV set locations—with the converters also providing the vehicle for information concerning use of the pay channels by use-generated signals conveyed by transmitter RF carrier modulated messages back through the distribution cable system to a central process receiver feeding bridging coupler tap-off. For example, assume that a pay channel program is distributed to each room occupying the channel from 120–126 MHz, designated as Channel A. At a particular room, the hotel guest must turn a selector switch to Channel A to cause the converter to change Channel A to, say, Channel 12. When this selector switch is turned to Channel A, a separate set of contacts are actuated to send a digital signal back to the central processor indicating that Channel A has been used at a designated room. A control box at each television receiver location houses the converter for that TV set, a digital encoder and timer, an RF transmitter, a channel program selector switch, and a coupler for feeding RF transmitter signal output back through the TV cable distribution system. Information containing the room number, channel being watched, and/or other information—housekeeping, fire, door, and theft alarm—is digital code modulated on an RF carrier in the sub-VHF band from 5 to 50 MHz. This is transmitted to the central processor receiver, demodulated, fed to the central processor, verified and stored for future use, including billing print-out.

A specific embodiment representing what is presently regarded as the best mode of carrying out the invention is illustrated in the accompanying drawings, including a block schematic diagram of applicant's communications pay TV monitoring and control system.

In the drawings:

FIG. 1 represents a block schematic diagram of applicant's communications pay TV monitoring and control system;

FIG. 2, a more detailed block schematic showing of a program selector control box connected to a TV set and connected to sensor alarm switches; and, FIG. 3, a more detailed block schematic showing of the return signal receiver and demodulator, and micro computer-printer comprising the central processor of FIG. 1.

Referring to the drawings:

The cable TV system 10, equipped with communications TV program monitoring equipment, as shown by FIG. 1, is shown to have a conventional TV video receiving signal antenna 11 feeding an amplifier section 12 having an output connection to signal combiner 13 that may also include amplifier circuitry (not shown). The output of the signal coupler 13 is passed by signal line (or cable) 14 through bridging coupler 15 to a signal splitting section of the TV cable distribution system including two-way splitters 16 and 17 and four-way splitter 18. The splitters 17 and 18 have multiple output distribution cable lines such as line 19, extended serially through a plurality of couplers 20, 20', 20", and on, for TV sets 21, 21', and on, respectively, at different locations down the distribution cable line 19. Each of the couplers is associated with a program selector control box 22, 22', and on, for the TV sets in the respective rooms or other locations. A conventional 60 Hz, 120 volt power distribution system 23 is connected for supplying power to both the program selector control boxes 22, 22', ... and the TV sets 21, 21', ... with the 60 Hz power the bases for a timing scheme in encoding digital massage content on RF signal carrier generated and fed back through the cable 19 and TV distribution system from RF signal generators contained in the boxes 22, 22', ....

At a particular room, the hotel or motel guest must turn a selector switch 24 to (for example) a Channel A setting to cause the converter in a box 22, 22', ... to convert the Channel A signal to a (for example) Channel 12 video signal. This also activates a separate set of contacts to modulate a digital signal on the RF carrier of the return signal transmitter in that box 22, 22', ..., sent back to the return signal receiver and demodulator 25 with the demodulated message content thereof passed to the central processor 26. The output connection 27 of bridging coupler 15 is connected through a filter 28 that passes the 5 to 50 MHz RF carrier sub-VHF signal generated in the return signal transmitters contained in control boxes 22, 22', .... Thus, filter 28 permits fed back RF signals from the transmitters in control boxes 22, 22', ... to be fed to the return signal receiver and demodulator unit 25, while blocking TV video signal flow from being passed to the receiver and demodulator unit 25. Other message signals that are digitally modulated on return signal transmitter RF carriers and transmitted from respective control boxes 22, 22', ... include, as required for various installations, housekeeping information input keyed from a housekeeping switch unit 29 by personnel servicing the room, fire alarm sensor switch unit 30, door open/closed state indicator switch unit 31, and equipment disconnect alarm sensor switch unit 32. Obviously, other sensor devices may provide other service-giving information to be modulated on the return signal transmitter RF carriers for transmission back to the return signal receiver and demodulator 25, and demodulated for message content use in the central processor 26.

In the system, additional video input program signals may be added at unused channel frequencies via signal combiner 13 from one or more of a plurality of like or dissimilar sources such as a microwave link 33 or video tape players 34 and 35. The microwave link 33 includes a microwave transmitter 36 having a video modulated output carrier transmitted from remote MW antenna 37 to system input MW antenna 38, feeding an input to microwave receiver 39 that provides an output converted through modulator translator 40 to a video modulated carrier signal applied to and through signal combiner 13 to the system cable 14. Video tape players 34 and 35 also provide outputs modulated on a selected one of TV mid-channel carriers in modulator translators 41 and 42, respectively, as additional video-modulated carrier signal inputs to signal combiner 13, and thereby to the system cable 14 when and if used singly or simultaneously, and also, in like manner, any additional such video signal sources as may be available for use.

The entertainment features, including movies and special service programming originating from sources such as the microwave link into a hotel or motel, or from a video tape player installed in the hotel, as translated to video, are modulated on RF carriers in the mid-band of the broadcast television VHF band between channels 6 and 7. Please note that these programing inputs could be modulated to other RF carriers not on used video channels—just as long as they may be translated by means of the converters in the control boxes at respective TV set locations to viewable, otherwise unused, channels of the TV sets—by the user simply turning the special channel select know on the control box, with the set tuned to the matching channel. This can be one channel setting on the TV set that all special video RF signals are translated to, or it can be a plurality of otherwise unused channels of the set that, respectively, one or more special video modulated RF signals are translated to. With a presently existing motel installation, the control boxes 22, 22', ... have a conventional knob 24 TV setting with which the TV set of that location is tunable to the normal TV stations for the area, two service program settings, and two entertainment billed-for program settings, with these latter four settings each selectively translating the respective video signals to a video signal received by the channel 12 setting on the TV set.

Referring also to FIG. 2, each radio frequency signal line 43 interconnecting respective couplers 20, 20', etc., to respective program selector control boxes 22, 22', etc., is connected to a high pass filter 44 and to a low pass filter 45, within the box 22. RF signals passed through high pass filter 44 are passed to switch 24, that can be set to contact 46 for passing TV video RF signals directly to TV set 21, or set to contacts 47 or 48 for passing RF signal content through midband to VHF converter circuit unit 49 for converting special program (such as paid movies) content RF signals to an available unused channel (or channels) of TV set 21. A separate set of contacts 50, 51, and 52, of a switch section 53 mechanically connected by link 54 (although this could be an electronically controlled switch activated by electronic interconnect with switch 24) actuate digital data encoder 55 to modulate a digital signal on the RF carrier of return signal transmitter 56 (shown as a 12 MHz RF signal transmitter in this instance). Other informational inputs actuating digital data encoder 55 in like manner, are switch units 29, 30, 31, and 32, that could be, respectively, for example, housekeeping, activated by personnel servicing the room; a fire alarm, thermostat-activated switch; a door, open/closed state, activated switch; and an equipment disconnect, or plug disconnect, activated switch. Obviously, there are all manner of signal generating devices that could be employed in addition to or in place of the simple switch units 29–32. Whatever these may be, the resulting digital signals modulated on the RF carrier transmitted from transmitter 56 are passed through low pass filter 45 to RF signal line 43.

The digital signal modulated RF carrier from transmitter 56, passed by low pass filter 45 through intervening circuitry and by filter 28, is fed through RF signal line 57 to return signal receiver and demodulator 25 (shown in greater detail in FIG. 3). The RF carrier signal content of line 57 is passed as an input to FSK (frequency shift keying) demodulator 58 (shown as a 12 MHz FSK demodulator). The output of demodulator 58 is applied as the activating input to Schmidt trigger circuit 59 output connected for driving monostable multivibrator 60, in turn, output-connected for stepping shift register 61. The plurality of output connections of shift register 61 are inputs to a comparator circuit 62, having preselected comparison circuit connections providing a plurality of signal outputs through parallel connections to micro-computer 63 that is equipped with printer 64 in a central processor 26. TTL logic is employed in much of this circuitry, with, for example, a Signetics 592 unit being used for some circuitry and with the micro-computer being an Intel SIM 4–03 unit.

Whereas this invention is herein illustrated and described with respect to one embodiment hereof, it should be realized that various changes may be made, such as indicated by the drawings and amplified by this description, without departing from the essential contributions to the art made by the teachings hereof.

I claim:

1. In a communications television monitoring and control system for a video signal distribution system constructed to transmit a plurality of video signal program channels from a head end through a common cable section connected through a distribution section to a plurality of television sets at various viewing locations: a plurality of control devices, including an RF switch and a video signal converter at various television set locations; a plurality of return RF signal transmitters, each connected for message activation by an associated one of said RF switches with one of said plurality of control devices; with said RF signal transmitters connected to feed message RF signaling, including preassigned RF signal transmitter location message signalling, back through said video signal distribution system when said RF switch is switched to a message activate state with video channel selection; and, return RF signal receiver means connected to said video signal distribution system for receiving return RF signals from said plurality of return RF signal transmitters for application to central message processing means.

2. The communications television monitoring and control system of claim 1, wherein a common AC power source is connected to said plurality of control devices and to said RF signal transmitters.

3. The communications television monitoring and control system of claim 2, wherein said distribution section includes signal feed splitter means; and with individual ones of said plurality of television sets being series coupled to individual output lines of respective ones of said signal feed splitter means.

4. The communications television monitoring and control system of claim 3, wherein signal input means are connected to feed signals generated thereby to said return RF signal transmitters for signal message transmittal back to said RF signal receiver means for message processing.

5. The communications television monitoring and control system of claim 4, wherein said signal input means includes room housekeeping message input means subject to activation by personnel servicing a room.

6. The communications television monitoring and control system of claim 4, wherein said signal input means includes an alarm sensing and signal generating device.

7. The communications television monitoring and control system of claim 6, wherein said alarm sensing and signal generating device is a fire detection and alarm device.

8. The communications television monitoring and control system of claim 6, wherein said alarm sensing and signal generating device is a door opening detection and signaling device.

9. The communications television monitoring and control system of claim 6, wherein said alarm sensing and signal generating device is an electrical article electrical disconnect sensing and signal generating device.

10. The communications television monitoring and control system of claim 1, wherein said RF signal receiver means includes connections to a signal message demodulator for signal message processing.

11. The communications television monitoring and control system of claim 10, wherein a filter constructed for selectively passing signal message modulated RF signalling from said RF signal transmitters and blocking video signals fed to the video signal distribution system is connected to the common cable section of the video signal distribution system; and with said filter output connected to said RF signal receiver means.

* * * * *

REEXAMINATION CERTIFICATE (2634th)
United States Patent [19]
Moorehead

[11] B1 4,057,829
[45] Certificate Issued Jul. 25, 1995

[54] COMMUNICATION TV MONITORING AND CONTROL SYSTEM

[75] Inventor: Robert M. Moorehead, Richardson, Tex.

[73] Assignee: Spectradyne, Inc., Richardson, Tex.

Reexamination Request:
No. 90/002,997, Mar. 16, 1993

Reexamination Certificate for:
Patent No.: 4,057,829
Issued: Nov. 8, 1977
Appl. No.: 602,315
Filed: Aug. 6, 1975

03/22/94

Related U.S. Application Data

[63] Continuation-in-part of Ser. No. 425,254, Dec. 18, 1973, abandoned.

[51] Int. Cl.[6] .............................................. H04N 7/18
[52] U.S. Cl. ................... 348/8; 340/286.08; 340/521; 340/534; 340/572; 348/1; 455/5.1; 455/67.5; 455/69; 455/130

[56] References Cited

U.S. PATENT DOCUMENTS

| | | | |
|---|---|---|---|
| 3,230,302 | 1/1966 | Bruck et al. | 358/86 |
| 3,255,306 | 6/1966 | Campbell et al. | 358/86 |
| 3,425,050 | 1/1969 | Tellerman et al. | 340/571 |
| 3,757,225 | 9/1973 | Ulicki | 455/2 |
| 3,761,914 | 9/1973 | Hardy et al. | 358/86 |
| 3,794,922 | 2/1974 | Osborn et al. | 455/4.2 |
| 3,833,757 | 9/1974 | Kirk, Jr. et al. | 358/86 |

FOREIGN PATENT DOCUMENTS

992725 5/1965 United Kingdom .

*Primary Examiner*—Howard W. Britton

[57] ABSTRACT

A communication control system applicable to an existing master antenna television (MATV) system normally installed in a building, or CATV systems that use special entertainment feature inputs including movies and/or sporting events and special services on a controlled pay or non-pay basis, as desired. The system employs one-way intelligence transmission from TV set locations to a central processor receiver and opposite direction program transmission in a selective control monitored mode with minimal additional equipment requirements over those of a basic TV cable system.

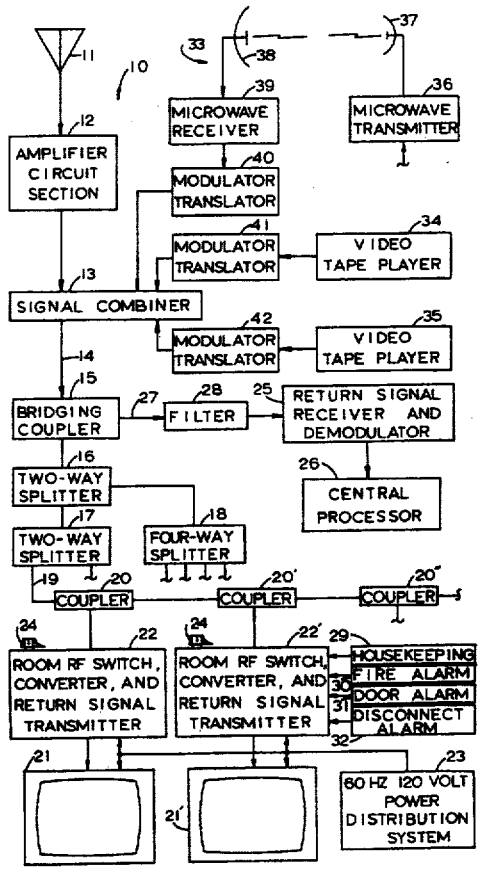

REEXAMINATION CERTIFICATE ISSUED UNDER 35 U.S.C. 307

NO AMENDMENTS HAVE BEEN MADE TO THE PATENT.

AS A RESULT OF REEXAMINATION, IT HAS BEEN DETERMINED THAT:

Claims 1-11 are now disclaimed.

1. In a communications television monitoring and control system for a video signal distribution system constructed to transmit a plurality of video signal program channels from a head end through a common cable section connected through a distribution section to a plurality of television sets at various viewing locations: a plurality of control devices, including an RF switch and a video signal converter at various television set locations; a plurality of return RF signal transmitters, each connected for message activation by an associated one of said RF switches with one of said plurality of control devices; with said RF signal transmitters connected to feed message RF signaling, including preassigned RF signal transmitter location message signalling, back through said video signal distribution system when said RF switch is switched to a message activate state with video channel selection; and, return RF signal receiver means connected to said video signal distribution system for receiving return RF signals from said plurality of return RF signal transmitters for application to central message processing means.

* * * * *